United States Patent [19]
Ueki et al.

[11] Patent Number: 5,281,383
[45] Date of Patent: Jan. 25, 1994

[54] METHOD FOR MOLDING A LAMINATED MOLDED ARTICLE USING A VENTED MOLD

[75] Inventors: Katsuji Ueki; Tetsuo Sakai, both of Kanagawa, Japan

[73] Assignee: Kasai Kogyo Co., Ltd., Tokyo, Japan

[21] Appl. No.: 779,984

[22] Filed: Oct. 21, 1991

[30] Foreign Application Priority Data

Mar. 13, 1991 [JP] Japan .................................. 3-048332

[51] Int. Cl.$^5$ ............................................. B29C 43/20
[52] U.S. Cl. ...................................... 264/259; 425/812
[58] Field of Search ................ 264/102, 511, 259; 156/244.24; 425/812

[56] References Cited

U.S. PATENT DOCUMENTS

| | | | |
|---|---|---|---|
| 3,452,124 | 6/1969 | Knapp | 264/102 |
| 4,139,177 | 2/1979 | Hanning | 264/DIG. 83 |
| 4,165,062 | 8/1979 | Mitchell | 249/141 |
| 4,267,142 | 5/1981 | Lankheet | 264/102 |
| 4,436,497 | 3/1984 | Dahl et al. | 249/141 |
| 4,740,346 | 4/1988 | Freeman | 264/102 |
| 4,873,045 | 10/1989 | Fujita et al. | 264/259 |
| 4,952,358 | 8/1990 | Okina et al. | 264/102 |

FOREIGN PATENT DOCUMENTS

| | | | |
|---|---|---|---|
| 57-002716 | 1/1982 | Japan | 264/102 |
| 58-059817 | 4/1983 | Japan | 264/102 |
| 62-158019 | 7/1987 | Japan | 264/102 |
| 62-193814 | 8/1987 | Japan | 264/102 |

*Primary Examiner*—Allan R. Kuhns
*Attorney, Agent, or Firm*—Dickstein, Shapiro & Morin

[57] ABSTRACT

In a method and device for combining a resin core member and a surface skin member at the same time as molding the resin core member into a desired shape, air and reaction gas trapped in the die cavity is removed through air vent pieces embedded in the die surfaces of the upper and lower dies so that a laminated molded article with a favorable appearance free from creases can be obtained. The air vent pieces may be either porous or provided with minute slits so that air and gas may be removed but the resin material may not seep through.

4 Claims, 6 Drawing Sheets

METHOD FOR MOLDING A LAMINATED MOLDED ARTICLE USING A VENTED MOLD

TECHNICAL FIELD

The present invention relates to a method and device suitable for molding laminated molded articles such as door trims and other automotive interior components.

BACKGROUND OF THE INVENTION

FIG. 9 shows an automotive door trim 1 which is given as an example of automotive interior components such as door trims, rear corner trims and so on, and this automotive door trim 1 consists of a resin core member 2 having a desired contour, and a surface skin member 3 which is integrally laminated on the surface of the resin core member 2.

The resin core member 2 is required to have highly complicated shapes to meet recent design requirements, and is typically fabricated by the mold press forming process or by molding resin material in semi-molten state in a mold press die set. To simplify the fabrication process, the surface skin member 3 is assembled to the resin core member 2 when molding the resin core member 2.

Referring to FIG. 10, with upper and lower dies 4 and 5 of a mold press die set opened up, the surface skin member 3 is placed between the upper and lower dies 4 and 5 by retaining the peripheral part of the surface skin member 3 with a clamping device 6. Thereafter, the upper die 5 is lowered until a prescribed gap is defined between the upper and lower dies 4 and 5, and resin material 8 consisting of polyolefin or other resin material in semi-molten state is distributed over the die surface of the lower die 4 from gates 7 provided in the lower die 4 so that the resin material 8 may be formed into the resin core member 2 having a desired curved contour and the surface skin member 3 may be integrally attached to the surface of the resin core member 2 at the same time.

However, according to this conventional process of combining a resin core member 2 and a surface skin member 3 simultaneous as mold press forming the resin core member 2, when the resin core member 2 has a complicated three-dimensional shape, air and reaction gas generating from the resin material 8 tends to remain in dips and bends of the die surface, and eventually collect in one place. This is known to cause creases in the surface skin member 3 when the upper and lower dies 4 and 5 are closed together as illustrated in FIG. 11. The air and the reaction gas may also cause voids in the resin core member 2.

This problem is even more pronounced in recent years as the upper and lower dies are fabricated with increasingly smaller tolerances as an effort to avoid the generation of burrs caused by resin material seeping through the parting line along the peripheral part of the upper and lower dies. It has been attempted to form a number of pin holes in the surface skin member 3 to remove trapped gas and air. However, in places where the surface skin member is stretched during the molding process, the resin material tends to seep out from the pin holes, and the surface skin member 3 gets damaged as a result.

BRIEF SUMMARY OF THE INVENTION

In view of such problems of the prior art, a primary object of the present invention is to provide an improved method for fabricating molded articles by combining a surface skin member and a resin core member at the same time as molding the resin core member into a desired shape which can prevent generation of creases due to trapping of gas and air between the surface skin member and the resin core member and other places in the molded articles.

A second object of the present invention is to provide a device which is suitable for carrying out the above mentioned method.

These and other objects of the present invention can be accomplished by providing a method for fabricating a laminated molded article by using a die set including upper and lower dies for mold press forming, comprising the steps of: placing a surface skin member between the upper and lower dies; closing the upper and lower dies one upon the other; distributing semi-molten resin material over a die surface of the lower die to mold the resin material into a resin core member having a desired contour and integrally attaching the surface skin member to a surface of the resin core member at the same time; and expelling air and gas produced from the resin material from air vent means provided at least in either one of the upper and lower dies, the air vent means being provided with small passages for communicating a die cavity defined between the upper and lower dies to an external part of the die set: and a device for fabricating a laminated molded article consisting of a resin core member having a desired contour and a surface skin member integrally attached to a surface of the resin core member, comprising: a lower die; an upper die which can be moved toward and away from the lower die for defining a die cavity in cooperation with the lower die; and air vent means provided in a die surface of at least one of the upper and lower dies and provided with minute passages communicating the die cavity with an external part of the device.

Preferably, the air vent means is provided in each of the upper and lower dies so that air and gas may be removed from both sides of the surface skin member which is usually not air permeable.

Thus, when the upper and lower dies are closed one over the other, air and gas generated from the resin material is removed from the die cavity via the air vent means. The removal of air and gas may take place from the die surface of the upper die and/or the die surface of the lower die. As a result, creating creases and voids in the fabricated article can be avoided.

The air vent means may consist of porous blocks made of sintered metal or alloy or metallic blocks provided with minute slits. In either case, the passages defined by the air vent means may directly communicate with an external part of the device or via communication passages defined in the upper and lower dies.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
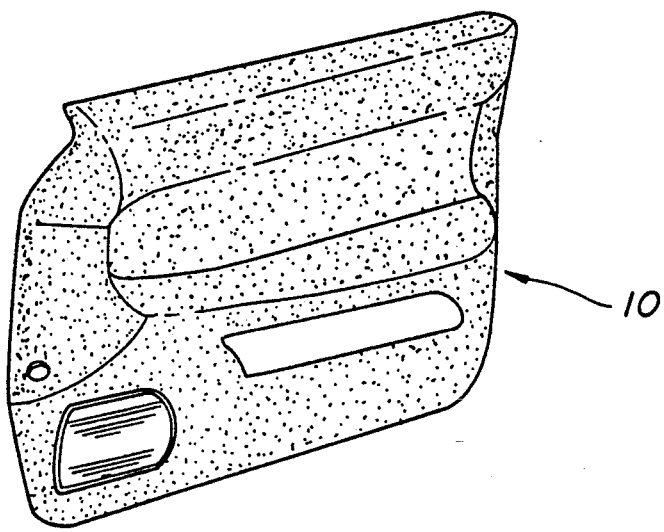
FIG. 1 is a perspective view showing an automotive door trim to which the present invention is applied.
Figure 2:
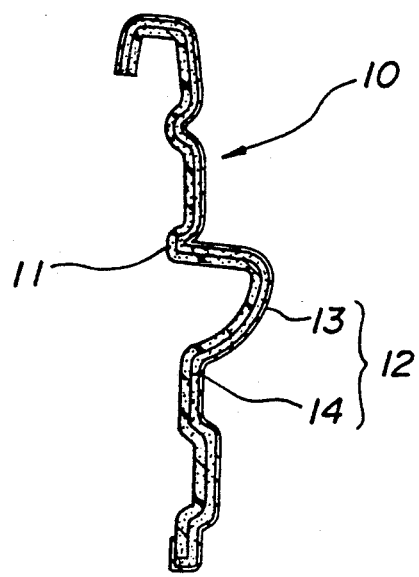
FIG. 2 is a sectional view of the door trim.

Referring to FIGS. 1 and 2, the automotive door trim 10 according to the present invention consists of a resin core member 11 molded into a desired shape, and a surface skin member 12 integrally laminated over the surface of the resin core member 11.

The resin core member 11 is made by the mold press forming process or by placing resin material such as PP (polypropylene) resin and ABS (acrylonitrile-butadiene-styrene) resin containing filler materials in a mold press molding die set and molding it into a desired shape. The surface skin member 12 may consist of any one of variety of resin materials such as PVC (polyvinylchloride) sheet, foamed PVC sheet, PVC sheet lined by polyethylene foam and PVC sheet lined by urethane foam. In the present embodiment, the surface skin member consists of a laminated sheet material consisting of a PVC sheet 13 laminated with a layer of polyurethane foam 14.

Now the molding device for mold press forming the automotive door trim according to the present invention is described in the following.

Figure 3:
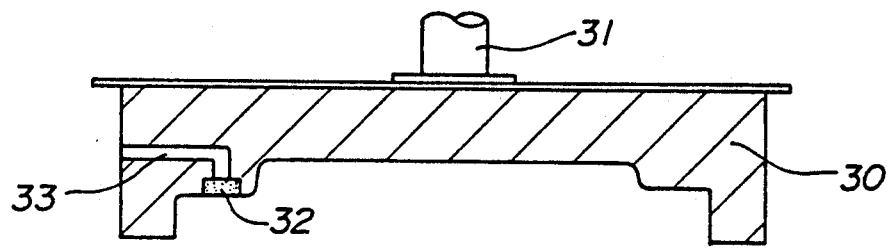
FIG. 3 is a sectional view showing a die set for molding the door trim.
Figure 4:
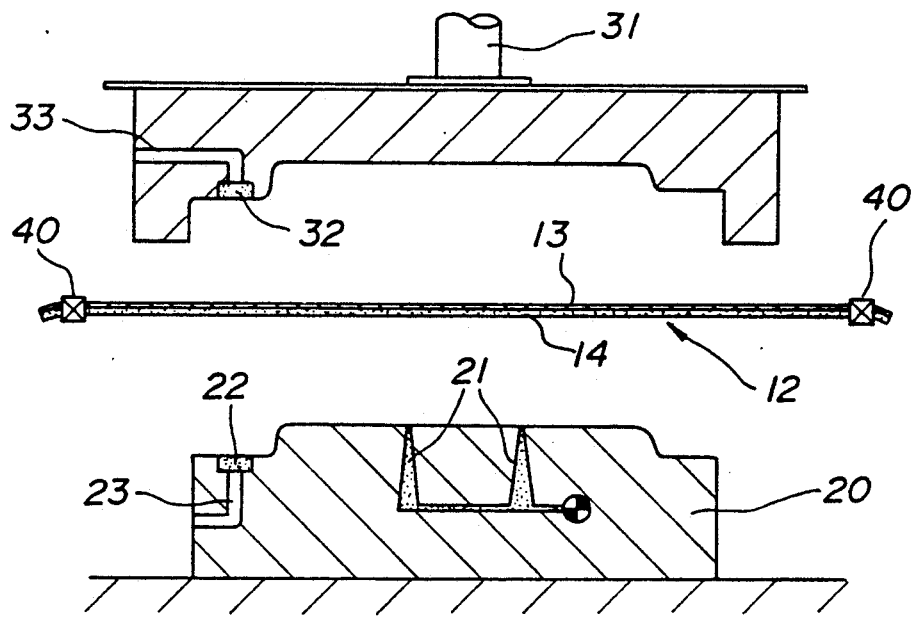
FIGS. 4 through 6 are sectional views showing different steps of the method of the present invention.
Figure 5:
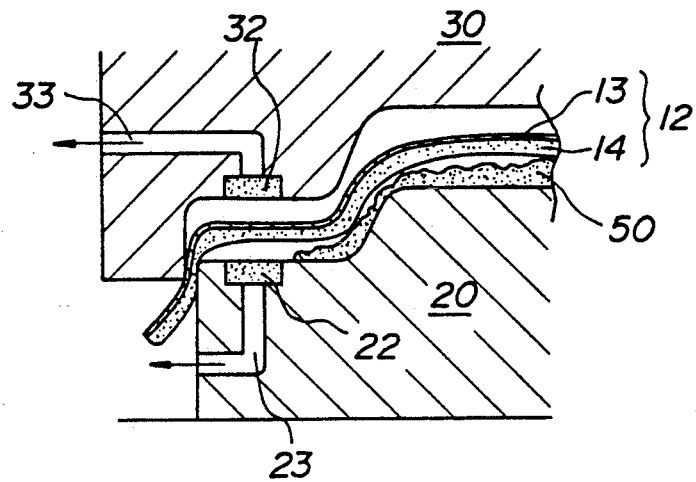
Figure 6:
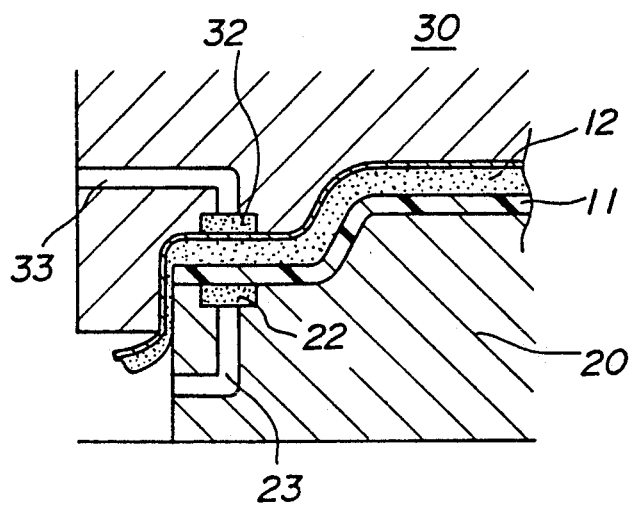

Referring to FIG. 3, the molding device of the present invention comprises a lower die 20 for mold press forming, and an upper die 30 having a substantially same die surface as the lower die 20 and disposed right above it. The upper die 30 is connected to a lifting device 31 so that the upper die 30 may be closed upon the lower die 20 leaving a small gap therebetween. To the lower die 20 is attached an extruder (not shown in the drawing) which supplies semi-molten resin material over the die surface of the lower die 20 from gates 21 provided in the lower die 20. The peripheral parts of the upper and lower dies 20 and 30 are formed with close tolerance so that burrs may not be formed when molding the resin core member 11.

Further, an air vent piece 22 made of sintered metal (which is made my compressing powder metal at high temperature) is embedded in the die surface of the lower die 20, and a similar air vent piece 32 is likewise embedded in the die surface of the upper die 30. The air vent pieces 22 and 32 are communicated with communication passages 23 and 33 so that air and reaction gas may be expelled from the die cavity.

Now the process of molding the automotive door trim illustrated in FIG. 1 with this molding device is described in the following with reference to FIGS. 3 through 6.

First of all, with the upper and lower dies 20 and 30 for mold press forming opened up, a surface skin member 12 is placed on the die surface of the lower die 20 by securing the peripheral part of the surface skin member 12 with a clamping device 40.

Then, the upper die 30 is lowered until a prescribed clearance is defined between the upper and lower dies 20 and 30, and a prescribed amount of resin material 50 is distributed in the cavity defined between the upper and lower dies 20 and 30 from the gates 21.

Trapped air and reaction gas released from the resin material 50 which may be trapped between the surface skin member 12 and the lower die 20 is expelled out of the cavity via the air vent piece 22 and the communication passage 23. Likewise, air and gas trapped between the surface skin member 12 and the upper die 30 is expelled from the air vent piece 32 and the communication passage 33.

Thus, adverse effects of reaction gas produced from the resin material 40 and air are eliminated, and an automotive door trim 10 with a satisfactory appearance can be fabricated without creating creases and breakage in the surface skin member 12.

Figure 7:
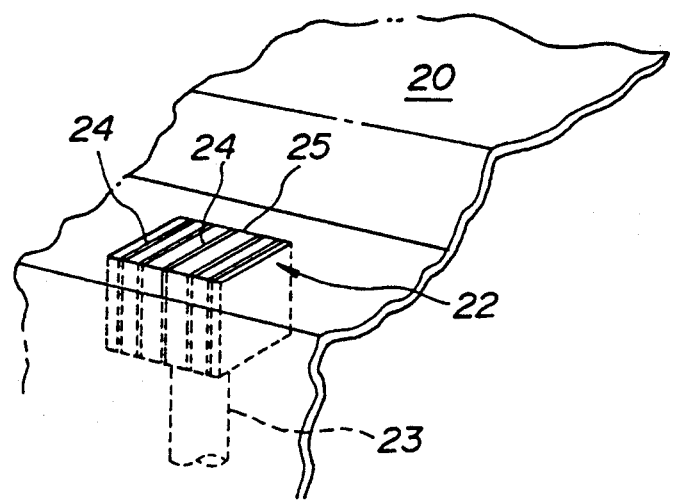
FIG. 7 is a fragmentary sectional view showing a second embodiment of the device of the present invention.
Figure 8:
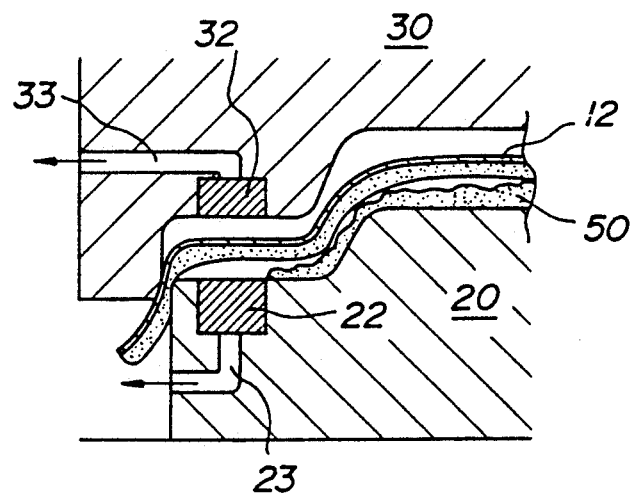
FIG. 8 is a sectional view similar to FIG. 3 showing the second embodiment.
Figure 9:
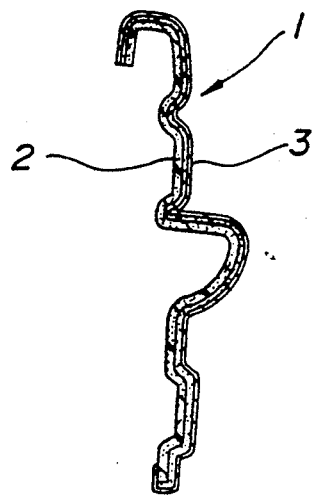
FIG. 9 is a sectional view of a door trim fabricated by the conventional method.
Figure 10:
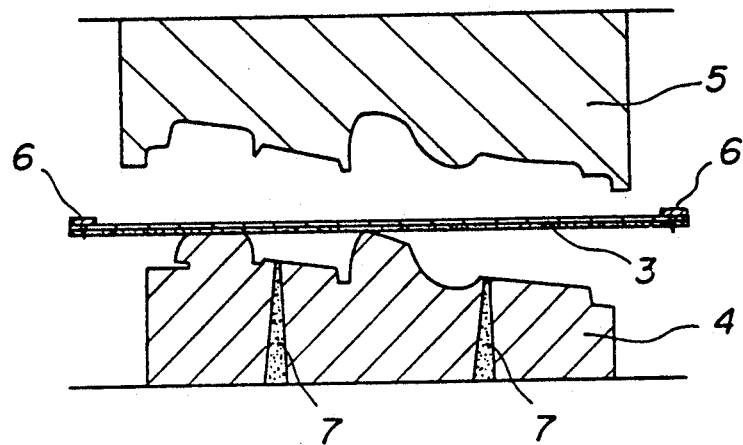
FIG. 10 is a sectional view of a conventional die set for mold press forming.
Figure 11:
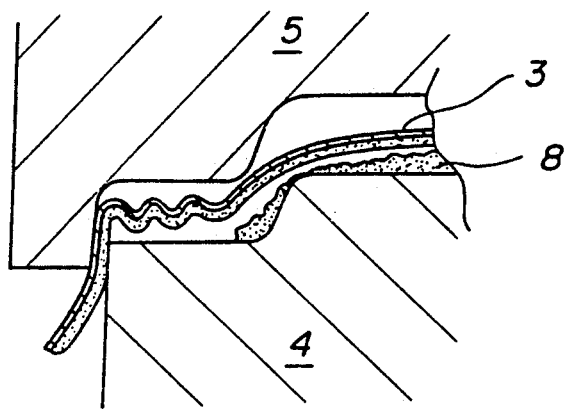
FIG. 11 is a sectional view showing the problems with the conventional method of mold press forming.

FIGS. 7 and 8 show a second embodiment of the molding device according to the present invention. The upper and lower dies of this embodiment are provided with a similar structure for removing air and gas, and only the structure for the lower die is described in the following.

In this embodiment, a metallic piece 25 having minute slits 24 of 0.001 to 0.002 mm in width is used as a part corresponding to the air vent piece 22 of the previous embodiment. The width of each of the slits 24 is so small that reaction gas and air can be expelled without allowing the resin material 50 to seep through these slits 24, and the same results as that of the air vent piece 22 made of sintered metal can be effected with the added advantage of economy. A similar air vent piece 32 and a communication passage 33 are provided in the upper die 30. If this metallic piece 25 is provided in a peripheral part of the lower die 20, the communication passage 23 can be omitted, and the die structure may be simplified.

The advantages of the present invention may be summarized as follows:

(1) In the step of combining the resin core member and the surface skin member, air and reaction gas trapped in the cavity of the die set can be expelled through a mechanism for removing trapped air and gas whereby a laminated molded body of a favorable appearance can be fabricated without creating wrinkles or creases in the surface skin member or voids between the surface skin member and the resin core member.

(2) Simply by embedding an air vent piece preferably in an area where air and gas tend to be trapped, air and gas can be efficiently expelled from the die cavity. Thus, the present invention can achieve favorable expulsion of air and gas without complicating the die structure.

Although the present invention has been described in terms of preferred embodiments thereof, it is obvious to a person skilled in the art that various alterations and modifications are possible without departing from the scope of the present invention which is set forth in the appended claims.

What we claim is:

1. A method for fabricating a laminated molded article by using a die set including upper and lower dies for mold press forming, comprising the steps of:

placing a surface skin member between said upper and lower dies;

closing said upper and lower dies one upon the other;

distributing semi-molten resin material over a die surface of said lower die to mold said resin material into a resin core member having a desired contour and integrally attaching said surface skin member to a surface of said resin core member at the same time; and expelling air and as produced from said resin material from air vent means, said air vent means comprising a porous block made of sintered metal or alloy which is embedded in the surface of at least one of said upper and lower dies, said porous block providing small passages for communicating a die cavity defined between said upper and lower dies to an external part of said die set.

2. A method according to claim 1, wherein said air vent means is embedded in the surface of each of said upper and lower dies.

3. A method for fabricating a laminated molded article by using a die set including upper and lower dies for mold press forming, comprising the steps of:

placing a surface skin member between said upper and lower dies;

closing said upper and lower dies one upon the other;

distributing semi-molten resin material over a die surface of said lower die to mold said resin material into a resin core member having a desired contour and integrally attaching said surface skin member to a surface of said resin core member at the same time; and expelling air and gas produced from said resin material from air vent means, said air vent means comprising a metallic block having minute slits which is embedded in the surface of at least one of said upper and lower dies.

4. A method according to claim 3, wherein said air vent means is embedded in the surface of each of said upper and lower dies.

* * * * *